Jan. 31, 1967   A. VAN SCHYNDEL ET AL   3,300,938
REINFORCING STEEL MAT STRUCTURE FOR CONCRETE SLABS
Filed April 15, 1964

INVENTOR
Andreas van SCHYNDEL
Günther SCHMIDT
BY
ATTORNEY

United States Patent Office 3,300,938
Patented Jan. 31, 1967

3,300,938
REINFORCING STEEL MAT STRUCTURE FOR CONCRETE SLABS
Andreas van Schyndel, Sturzelberg, near Neuss, and Günther Schmidt, Dusseldorf, Germany, assignors to Bau-Stahlgewebe G.m.b.H., Dusseldorf-Oberkassel, Germany, a company of Germany
Filed Apr. 15, 1964, Ser. No. 359,912
Claims priority, application Germany, Apr. 3, 1963, B 71,400
9 Claims. (Cl. 52—581)

The present invention relates to reinforcing structures for use in concrete construction parts, in particular concrete slabs, plates, floors, walls, and the like units embodying a reinforcing steel mat consisting of intersecting bars or rods spot welded or otherwise joined at their intersection points.

Reinforced concrete structures are frequently required in considerable widths, whereby to make it necessary or desirable for practical and economic reasons to assemble or construct the structures in the form of a multiplicity of oblong rectangular mat units each being comprised of intersecting longitudinal and transverse or cross bars and arranged in mutually overlapping relation at their marginal zones, to provide a composite mat of increased width and to ensure a continuous flux or field of force across the entire width of the structure.

Where the structures are loaded one-sidedly, or subjected to tensile or bending stress in the longitudinal direction of the units only, or where only the longitudinal bars are loaded or subject to stress and the cross bars serve as spacing elements only for the longitudinal bars, the minimum overlap of the cross bars of adjacent mat units corresponds, from a static point of view, to the distance between two longitudinal bars arranged at right angles to said cross bars. In the case of double-sided or crosswise loading, that is, where the structures are subjected to tensile or bending stress in both the lengthwise and crosswise directions of the mat untis, or where both longitudinal and cross bars are subjected to loading stress, the extent of the overlap must be about three times the spacing distance of the longitudinal bars of the mat units. Expressed in conventional orders of magnitudes, the minimum overlap in the case of single-sided loading, or with only the longitudinal bars being subjected to loading stress, amounts to about 10 cm. and in the case of crosswise loading to about 30 cm., in concrete structures of the general character referred to herein.

In order to maintain the overlap of the cross bars at a minimum, it is possible, in the case where the longitudinal and cross bars are fixedly connected to each other, to additionally utilize the bars at right angle to the cross bars within the overlap regions as anchoring means in the interest of ensuring a continuous field of force across the entire width of the mat assembly. Expressed in general terms, it is necessary to provide a predetermined number of bars transverse to the cross bars or, in other words, to provide a predetermined number of meshes within the overlap regions of the cross bars of adjacent mat units.

As a consequence, there occurs in the overlap regions twice the number of longitudinal bars, or bars at right angle to the cross bars, whereby, with all the bars having an equal or constant spacing distance and an equal diameter across the width of the mat units, the steel or metal cross-section, per unit width of the slab or the like, of the longitudinal bars within the overlap regions will be twice the amount required for static or structural reasons, that is, to provide the required resistance to tensile and bending stresses within the overlap regions to which the structures are subjected in use. In other words, the marginal longitudinal bars within the overlap regions, serving to effect anchoring of the mats and extending parallel to the longitudinal edges thereof, are not utilized in the static sense to their fullest extent or capacity, whereby to involve a considerable waste of steel and resulting in increased cost of the structures, especially where a great number of mat units or components are required.

Reinforcing multiple steel mat assemblies of the type referred to have already become known which are constructed to achieve a better utilization, from a static point of view, of the longitudinal bars within the overlap regions. On the other hand, with mats of this type a new problem has arisen in the endeavor to maintain the width of the overlap regions of adjacent mat units at a minimum, while ensuring the necessary continuity of the flux or field of force across the entire width of the composite structures or assemblies, on the one hand, or to limit the unavoidable excess length of the cross bars and, in turn, to minimize the amount of excess steel or material required, on the other hand.

Thus, a multiple mat structure has become known wherein all the longitudinal bars of the mat units are of the same diameter and the marginal bars within the overlap regions of the units are spaced by twice the distance compared with the spacing distance of the bars within the intermediate regions of the units. The mat units in the assembled position are so positioned as to cause the marginal bars of one unit to coincide with the middle of the gaps or meshes formed by the marginal bars of the adjacent unit of the assembly, in such a manner that the longitudinal bars within the overlap regions of the assembled structure are spaced by the same distance as the intermediate bars of the units, to result in an equal loading stress across the entire width of the multiple mat structure or assembly.

In an arrangement of the foregoing type, the longitudinal bars within the overlap regions are more or less fully utilized in the static sense, though at the expense of a considerable amount of excess steel being required for the cross bar overlap. More particularly, if the cross bars are unloaded, that is, if the concrete structure is subjected to single-sided loading only, two meshes are required within the overlap regions having a width equal to twice the distance between the longitudinal bars of the intermediate regions of the mat units. On the other hand, if the structures are subjected to double-sided or crosswise loading, that is, if both the longitudinal and cross bars are subjected to tensile or bending stress during use, four meshes will be required within the overlap regions having a width of twice the spacing distance of the bars within the intermediate regions. As a consequence, the width of the overlap regions is increased, it being further necessary to take into consideration that with mats of this type a mesh in the marginal zone has a width equal to twice that of the meshes of the intermediate regions of the mat units.

As a consequence, the use of reinforcing mats constructed in the manner afore-described involves the consumption of a considerable amount of excess steel due to the increase of the length of the cross bars, or width of the mat units, inasmuch as the statically required overlap is exceeded to a considerable degree or since the cross bars overlap each other in the assembled structures to an extent far beyond the overlap required from the purely static or structural point of view. As a matter of fact, the amount of excess steel required may be as high, especially in the case of crosswise loading of the structures, as to render illusory the original attempt or concept of fully utilizing the longitudinal bars within the overlap regions. In other words, the initially sought for saving of steel may be nullified or even converted into an excess consumption or requirement.

According to another well-known multiple mat construction, the longitudinal bars have the same spacing distance across the entire width of the mat units with at least two longitudinal marginal bars, in case of single-sided loading of the concrete structure, or with at least four marginal bars, in case of crosswise or double-sided loading of the structures, being provided with a diameter less than the diameter of the intermediate bars of the mat units. In the preferred embodiment, the diameter of the thinner (marginal) bars is equal to one half the diameter of the (thicker) bars of the intermediate regions. In the assembled structure composed of mat units of this type, the bars of lesser diameter overlying the similar bars of the adjacent mat units within the overlap regions are the equivalent of a single bar of correspondingly increased diameter, whereby, with the marginal bars having one half the diameter of the bars in the intermediate regions, the longitudinal bars within the overlap regions are again fully utilized from the static point of view, it being desirable to limit the extent of overlap to the minimum required by static considerations and in the effort to minimize the excess length of the cross bars due to the overlap.

In the reinforcement of concrete slabs, plates, or the like units, it happens frequently that the useful static height within the overlap regions of the multiple mat structures is decreased. In particular, in the case of relatively thin units, such as plates or slabs of reduced thickness, the unavoidable reduction of the useful static height or thickness has been found to interfere with or deleteriously effect the allover strength of the concrete structures. This reduction of the useful static height is predicated on the fact that the center of gravity of two superposed bars or rods spaced by a transverse or cross bar is at a higher point than the center of gravity of an equivalent single bar of correspondingly increased cross-section.

In the case of concrete construction units of average thickness, the reduction of the useful static height is practically negligible. As an example, for a slab thickness of about 15 cm. the necessary increase in steel cross-section, to compensate for the reduction of the useful static height or to avoid excess stress within the overlap regions of the mat units, remains within the admissible tolerance range of 3% prevailing for concrete constructions of the type under consideration. On the other hand, with a slab thickness of 10 cm., the required increase in steel cross-section, to eliminate excess stress within the overlap regions, amounts to about 7% while with a slab thickness of 7 cm., a 10% increase of the steel cross-section is required, to compensate for the reduction of the effective or useful static height of the concrete structures. Such local excess stresses must by all means be avoided or taken into consideration in the design of concrete structures of the type forming the basis of the invention.

There is further described in our copending patent application Serial No. 336,922 a multiple reinforcing mat structure, wherein, with the use of longitudinal bars of equal diameter throughout, the marginal longitudinal bars within the overlap regions are spaced by a distance being twice the spacing distance of the intermediate bars of the mat units, in an effort to provide an equal steel cross-section per unit width across the entire mat structure. While it is possible with an arrangement of this type to increase, by a limited reduction of the spacing distance of the marginal bars, the steel cross-section within the overlap regions in an effort to compensate for the reduction of the useful static height, the arrangement is greatly limited due to lack of flexibility to comply with the varying practical conditions and requirements without involving an undue excess steel consumption as well as other drawbacks and shortcomings.

Where relatively large diameter steel bars or rods are required, the reduction of the effective or useful static height of the slabs may be as high as 1 cm., whereby still greater excess stresses may be encountered in the overlap regions of concrete structures of the type under consideration. The known mat structures or assemblies are incapable of withstanding peak stresses resulting from the reduction of the useful static height, in that the known arrangements, while enabling the achievement of a uniform steel cross-section in both the overlap and intermediate regions of the mat units, are inherently devoid of the necessary flexibility in affording steel increase within economic limits in the overlap regions, to compensate for the substantial excess loads or stresses mentioned and encountered in practice.

An important object of the present invention is therefore the provision of an improved multiple reinforcing steel mat assembly of the type referred to capable of withstanding excess stresses substantially without foregoing the full utilization of the longitudinal bars within the overlap regions, while at the same time reducing to a minimum the required excess length of the cross bars of the units.

Another object of the invention is the provision of a multiple reinforcing steel mat assembly of the type referred to, wherein the total steel cross-section per unit slab width within the overlap regions, as compared with the steel cross-section of the intermediate regions of the units, may be varied closely and substantially independently of the remaining parameters of the mat units, such as the main spacing distance between or diameter of the bars in the intermediate regions, the width of the overlap regions, to achieve a continuous field of force across the entire width of the assemblies, as well as the thickness of the slabs or the like construction units.

The invention, both as to the foregoing and ancillary objects as well as novel aspects thereof, will be better understood from the following detailed description of a few practical embodiments, taken in conjunction with the accompanying drawing forming part of this specification and in which.

Like reference characters denote like parts in the different views of the drawing.

Figure 1:
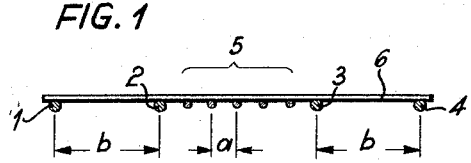
FIG. 1 is a schematic cross-sectional view through a reinforcing steel mat construction unit embodying the principles of the invention.

With the foregoing objects in view, the invention involves generally the provision of a multiple reinforcing steel mat assembly of the type referred to being embedded in a concrete slab or the like construction unit, wherein the overlapping mat units include at least two marginal longitudinal bars at one end of and located within the overlap regions of the units in the assembled position, said marginal bars having a spacing distance and diameter differing, respectively and in the same sense, from the spacing distance and diameter of the intermediate bars of the units, in such a manner as to provide a predetermined, including unity, ratio between the steel cross-sections per unit width of the slab or composite structure within the overlap regions and within the intermediate regions of the units, respectively. As a consequence, the overlap regions both as to their width and the number of overlapping bars, providing the necessary anchoring of the mat units and ensuring the continuity of the flux or field of force across the entire width of the structures, may be chosen or designed independently and in consideration of the static or structural requirements, while at the same time minimizing the amount of excess steel or width of the units. Moreover, the ratio of the steel cross-section per unit width within the overlap regions to the steel cross-section per unit width within the intermediate regions of the units may be closely controlled by varying both the spacing distance and diameter of the marginal bars within the overlap regions. More particularly, for slabs of relatively large thickness, where the reduction of the useful static height is negligible, the steel cross-section per unit width within the overlap and intermediate regions may be the same, to result in a uniform stress across the entire width of the structures. On the other hand, where relatively thin concrete slabs are used with the reduction of the useful static height making itself felt to an ever increasing degree, the steel cross-section per unit width within the overlap regions may be increased by a corresponding variation of the spacing distance and diameter of the marginal bars within said regions, in such a manner as to substantially eliminate excess stress within said regions both in case of single-sided and/or crosswise loading of the structures, in a manner as will become further apparent from the following description of the drawing.

Figure 2:
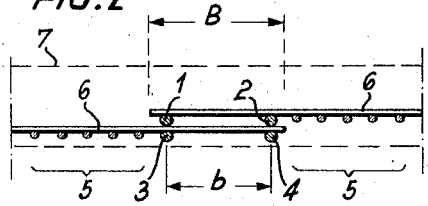
FIG. 2 shows a pair of mat units according to FIG. 1 in assembled position and embedded in a concrete slab or the like in accordance with the invention.

FIG. 1 illustrates a mat unit or component according to the invention with the longitudinal bars of the unit shown in section. In the example shown, the marginal longitudinal bars 1, 2 and 3, 4 of the unit have a spacing distance $b$ and a diameter which are both greater, respectively, than the spacing distance $a$ and diameter of the intermediate bars 5, all said longitudinal bars being connected, by spot welding or the like, by a number of cross bars 6, in the manner indicated and understood by those skilled in the art. Such a mat unit may be combined with similar units into a composite structure or assembly with the overlap regions of the units comprising a single mesh of width $b$, as shown in FIG. 2, or multiple meshes as described hereafter. In FIG. 2, the concrete slab or plate is indicated in dashed lines 7. Such an assembly is especially suited for use in connection with single-sided loading of the concrete structure, that is, with the cross bars 6 serving merely as spacing elements for the longitudinal bars.

With a construction shown by FIG. 2, the spacing distance and/or diameter of the marginal bars 1, 2 and 3, 4 may be controlled or varied within substantial limits in an effort to achieve a substantially full or uniform utilization, from the static point of view, of the longitudinal bars within the region B which may correspond to the theoretical or optimum overlap ensuring the continuity of the field of force across the entire assembly or concrete structure. Moreover, the design of the bars 1, 2 and 3, 4 may be such as to eliminate local excess stress within the region B, especially in the case of slabs or the like units 7 of relatively small thickness 1 as described in greater detail hereafter.

By a suitable choice or design of the distance $b$ between and diameter of the bars within the marginal or overlap regions, the steel cross-section per unit width within said regions may be varied in the manner described, to suit any existing load conditions or requirements. According to an especially advantageous construction, the steel cross-section per unit width within the overlap regions may exceed the steel cross-section per unit width within the intermediate regions to an extent to substantially compensate for any existing reduction in the useful static height of said regions, such as in the case of relatively thin slabs or the like construction units.

The variation of the steel cross-section within the marginal or overlap regions of the mat units may be achieved by various methods, such as by varying both the distance between and the diameter of the marginal bars. In this manner it is possible to comply with the numerous requirements and problems encountered in practice. As will be understood an equal cross-section per unit width may be achieved in the same manner, that is within both the overlap and intermediate regions, if and when required.

Figure 3:
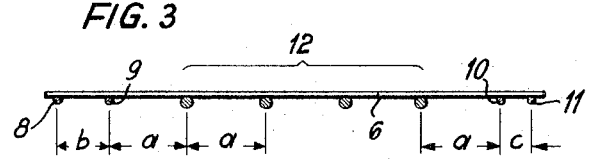
FIG. 3 shows an alternative construction of a steel mat unit according to the invention.

FIG. 3 illustrates an alternative embodiment of a mat unit constructed in accordance with the invention, wherein the diameter of the marginal bars is less than and the spacing distance of said bars is reduced compared, respectively, with the diameter and spacing distance of the intermediate bars of the mat units. Besides, FIG. 3 illustrates still a further improved feature of the invention in that the distances between the marginal bars 8, 9 and 10, 11 at the opposite sides of the unit, while being less than the distance of the intermediate bars differ from each other, as indicated in the drawing. More particularly, in the example shown the distance $b$ between the marginal bars 8 and 9 is less than the distance $c$ between the marginal bars 10 and 11, both said distances $b$ and $c$ being, in turn, less than the distance $a$ between the intermediate bars 12. There is thus provided a further possibility of closely controlling the steel cross-section within the overlap regions, to afford a compliance with practically any load conditions or requirements.

Simultaneously with the reduction of the distances $b$ or $c$ in a mat construction of the foregoing type, the width B of the overlap region and, in turn, of the length or size of the cross bars 6 is reduced, whereby to result in a reduction of the amount of excess steel required or increased economy of the composite structure or assembly.

Figure 4:
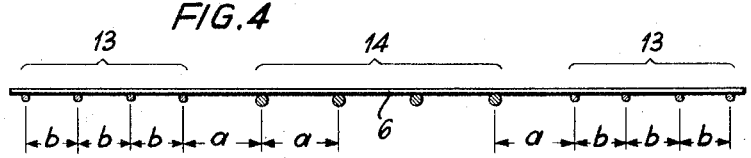
FIG. 4 shows still another modification of a steel mat or component unit constructed in accordance with the invention.
Figure 5:
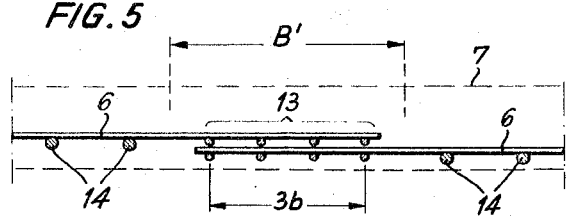
FIG. 5 shows a pair of mat units according to FIG. 4 in assembled position and embedded in a concrete slab or the like construction unit.

FIG. 4 illustrates another modification of a reinforcing mat unit according to the invention, being especially designed for crosswise loading of the assembled or composite structure as shown by FIG. 5. In the latter, four longitudinal bars 13 having a spacing distance $b$ are provided in the marginal zones of the mat unit having intermediate bars 14 of spacing distance $a$, the latter being greater than the marginal spacing distance $b$. At the same time, the intermediate bars 14 have a greater diameter than the marginal bars 13, while the cross bars are again indicated at 6 as in the preceding figure.

Referring to FIG. 5, it is seen that a greater number of marginal bars are provided than in the case of FIG. 2 in accordance with the increased overlap region B'. The slab or plate is again indicated at 7 as in the preceding figure.

As pointed out hereinbefore, the invention provides relatively simple means and a method of controlling the steel cross-section within the overlap regions by varying both the spacing distance between and diameter of the longitudinal bars within said regions, whereby to enable a close adaptation to any existing load conditions or requirements. In particular, the invention makes it possible to avoid undesirable intermediate values of the cross-section or diameters of the bars by the variation of both the spacing distance and diameter and, advantageously, by the use of different spacing distances $b$ within the opposite marginal zones of the units as shown in FIG. 3. In other words, it is possible by the use of the present invention to utilize existing bars of standard or conventional diameter throughout in an effort to achieve a close control of the steel cross-sections for both relatively thick or thin slabs or the like concrete construction units, in the manner described and understood from the foregoing.

In addition to the advantages described, the use of bars having different marginal diameters is conducive to preventing or minimizing errors during the assembly operations by serving as optical guides or instructions to the operators.

In the foregoing, the invention has been described in reference to a few illustrative examples or devices. It will be evident however, that variations and modifications, as well as the substitution of equivalent parts or elements for those shown and disclosed, may be made without departing from the broader scope and spirit of the invention as set forth in the appended claims. The specification and drawing are accordingly to be regarded in an illustrative rather than a restrictive sense.

We claim:
1. In a reinforced concrete structure, a concrete slab having embedded therein a reinforcing steel mat composed of a multiplicity of oblong rectangular mat units each consisting of intersecting longitudinal and cross bars rigidly connected with each other at the intersection points, said units being arranged in juxtaposed and mutually overlapping relation with at least two marginal longitudinal bars of one unit overlying the corresponding marginal bars of an adjacent unit within the overlap regions of the units, and marginal bars having a spacing distance and diameter differing, respectively and in the same sense, from the spacing distance and diameter of the intermediate bars of the units, whereby to provide a predetermined, including unity, ratio between the steel cross-section per unit width of said slab within said overlap regions and of said intermediate regions, respectively.

2. In a reinforced concrete structure as claimed in claim 1, wherein both the spacing distance and diameter of the longitudinal marginal bars of the mat units are greater, respectively, than the spacing distance and diameter of the intermediate bars of the respective units.

3. In a reinforced concrete structure as claimed in claim 1, wherein both the spacing distance and diameter of the longitudinal marginal bars of the mat units are less, respectively, than the spacing distance and diameter of the intermediate bars of said units.

4. In a reinforoced concrete structure as claimed in claim 1, wherein the spacing distance and diameter of the marginal bars at different ends of said units differ to a varying extent from the spacing distance and diameter, respectively, of the intermediate bars of said units.

5. In a reinforced concrete structure as claimed in claim 1, wherein the steel cross-section per unit width of said slab within the marginal zones of said units in the overlap regions exceeds the steel cross-section per unit width within the intermediate zone of the units to an extent as to substantially compensate for the reduction of the useful static height of said slab within the overlap regions.

6. In a reinforced concrete structure as claimed in claim 1, being subject to loading stress in the longitudinal direction only of said units, wherein the marginal regions of said units comprise two longitudinal bars overlying corresponding bars of the adjacent units in the assembled position and having a spacing and diameter in excess of the spacing and diameter, respectively, of the bars of the intermediate regions of said units.

7. In a reinforced concrete structure as claimed in claim 1, being subject to loading stress in both the longitudinal and crosswise directions of the units, wherein the marginal regions of said units comprise four longitudinal bars overlapping corresponding bars of the adjacent units in the assembled position of the units and having a spacing distance and diameter less, respectively, than the spacing distance and diameter of the longitudinal bars in the intermediate regions of said units.

8. In a reinforced concrete structure as claimed in claim 1, the overlap regions of said units being designed with a minimum width from a structural and static point of view, to ensure continuity of the field of force across the width of the assembled structure, and the spacing distance and diameter of the longitudinal bars within the overlap regions being such as to provide a substantially equal steel cross-section per unit width of said slab within both the overlap and intermediate regions of said units.

9. In a reinforced concrete structure as claimed in claim 1, the overlap regions of said units being designed with a minimum width from a structural and static point of view, to ensure continuity of the field of force across the width of the assembled structure, and the spacing distance of the longitudinal bars within the overlap regions being such as to provide an excess steel cross-section per unit width of said slab within the overlap regions compared with the intermediate regions of said units, to substantially compensate for the reduction of the useful static height of said slab within the overlap regions of said units.

References Cited by the Examiner

FOREIGN PATENTS

| | | |
|---|---|---|
| 570,900 | 9/1958 | Belgium. |
| 1,246,483 | 10/1960 | France. |
| 1,289,109 | 2/1962 | France. |
| 1,062,914 | 8/1959 | Germany. |
| 1,132,311 | 6/1962 | Germany. |

HARRISON R. MOSELEY, *Primary Examiner.*

A. I. BREIER, *Assistant Examiner.*